Dec. 8, 1959 J. SCHULZE ET AL 2,916,211

ELECTRONIC CALCULATING MACHINES PROVIDED WITH AN ARRANGEMENT FOR ROUNDING OFF ELECTRONIC COUNTERS

Filed Feb. 8, 1957 4 Sheets-Sheet 1

INVENTORS
JOACHIM SCHULZE
JOHANNES HOFMANN

Dec. 8, 1959 J. SCHULZE ET AL 2,916,211

ELECTRONIC CALCULATING MACHINES PROVIDED WITH AN ARRANGEMENT FOR ROUNDING OFF ELECTRONIC COUNTERS

Filed Feb. 8, 1957 4 Sheets-Sheet 2

INVENTORS
JOACHIM SCHULZE
JOHANNES HOFMANN

INVENTORS
JOACHIM SCHULZE
JOHANNES HOFMANN

INVENTORS
JOACHIM SCHULZE
JOHANNES HOFMANN

1

2,916,211

ELECTRONIC CALCULATING MACHINES PROVIDED WITH AN ARRANGEMENT FOR ROUNDING OFF ELECTRONIC COUNTERS

Joachim Schulze, Limbach-Oberfrohna, and Johannes Hofmann, Erlangen, Germany, assignors to VEB Buchungsmaschinenwerk, Karl-Marx-Stadt, Germany Application February 8, 1957, Serial No. 639,096

2 Claims. (Cl. 235—160)

This invention relates to an electronic calculating machine provided with an arrangement for rounding off decadic electronic counters or the product digits contained therein.

When electronic calculating machines are used every day, for instance in trade, it is sometimes necessary to round off the results, particularly in case of multiplications and divisions, where the results require only a certain number of digits after the decimal point.

Rounding off is performed in the usual way. For example, if a calculating operation refers to kilograms and the indicated accurate result has four decimals, they are rounded off to three decimals. In operations involving monetary units like marks, for instance, three decimals are rounded off to two decimals. As the number of decimals varies, the rounding off arrangement must be designed accordingly.

It has been proposed to perform sensing of the counters as required for rounding off by individual sensing of the four tube systems of each decadic counter. As these four tube systems represent the values 1, 2, 4 and 8, it is necessary in combinations yielding a value exceeding five to cause a transfer pulse to be given to the next counter which is thereby increased by one. However, this method requires a highly complicated system of connections for each counter to be sensed as well as for the entire arrangement and involves considerable expense and needs more space.

The invention intends to develop a rounding off arrangement of the nature indicated, which requires the least possible amount of switching and which substantially gets along with the switching elements already present for normal calculations. This objective is attained by sensing the counters by pulses used for general calculating operations and entered by control counters over known switching means in the corresponding counters. At filling up of a counter a transfer pulse is applied to the next counter and rounding off effected.

One form of the invention is illustrated in the accompanying drawings, in which

Figure 1:
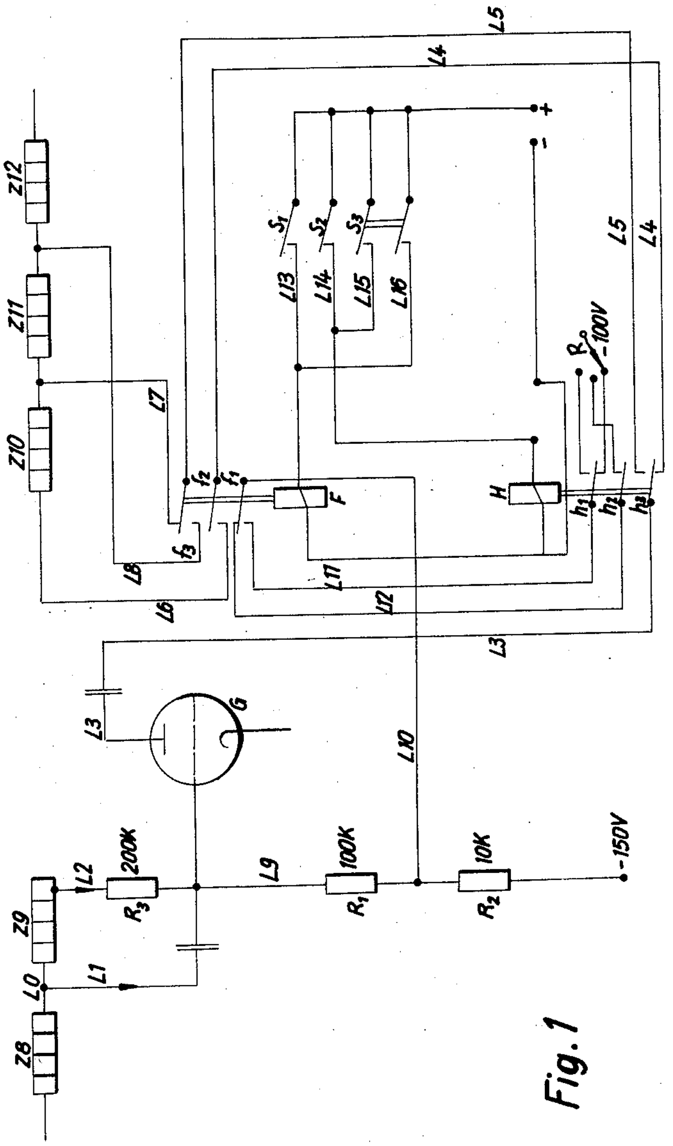
Figure 2:
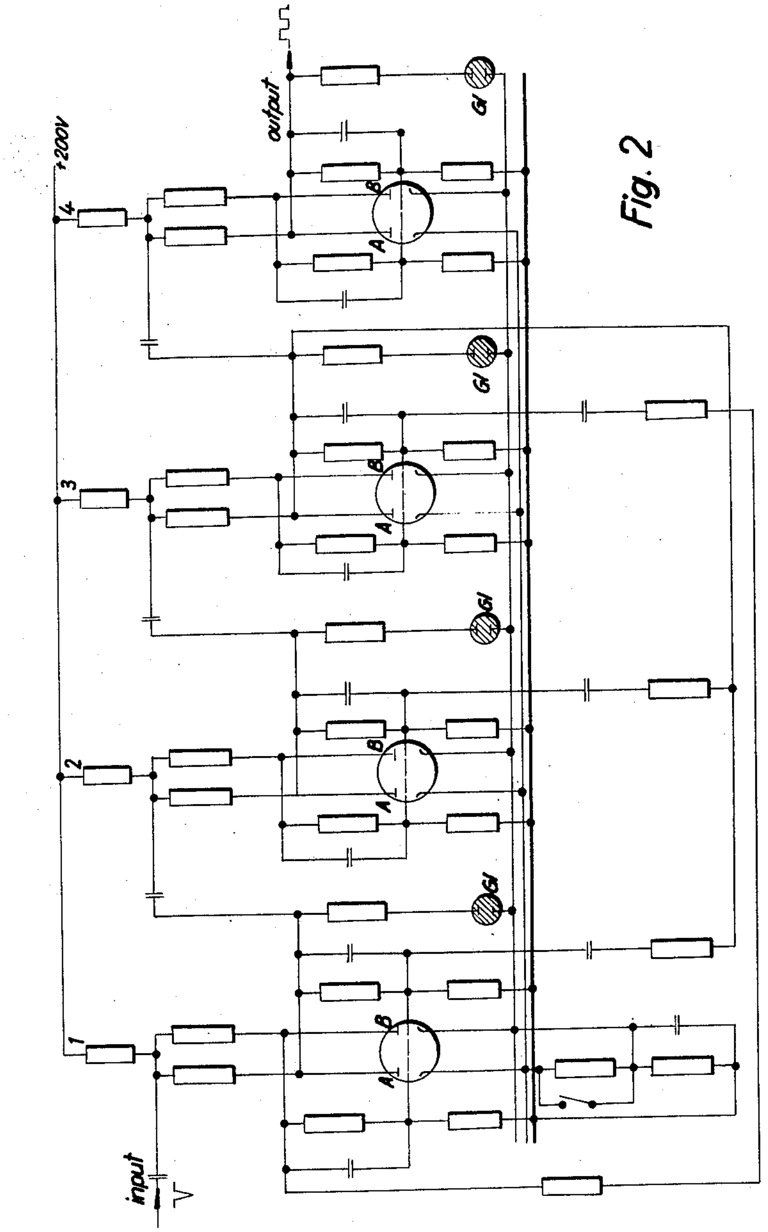
Figure 3:
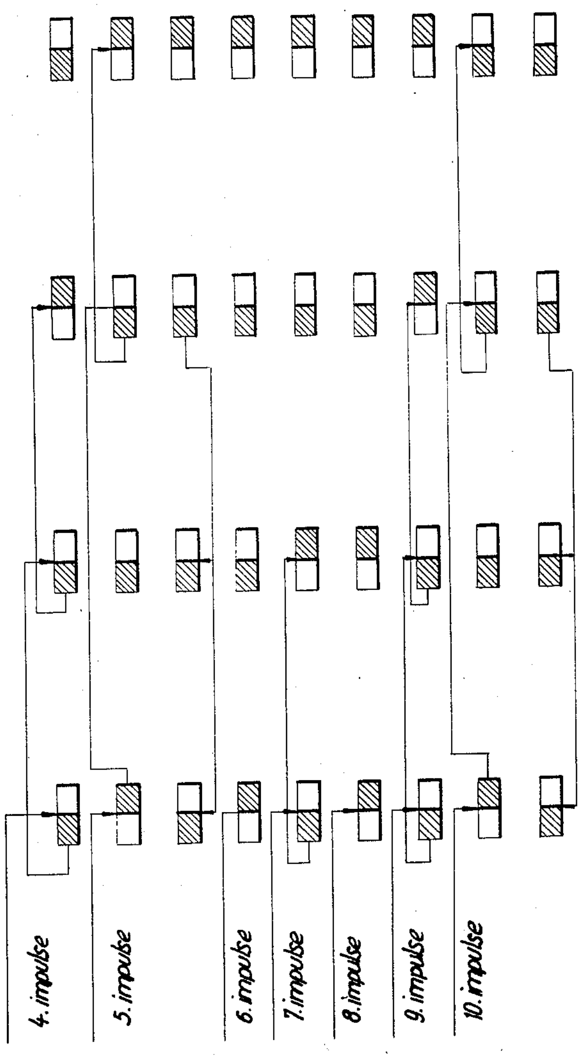
Figure 4:
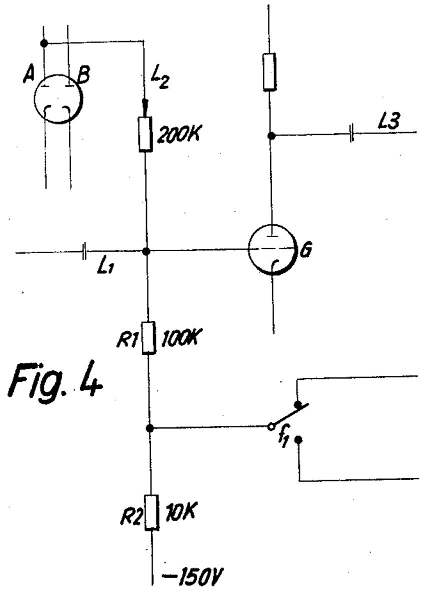

Figure 1 shows the connections of the arrangement;

Fig. 2, a connection diagram of an electronic counter;

Fig. 3, a schematic representation according to Fig. 2;

Fig. 4, the method of operation of a gate; and

Figure 5:
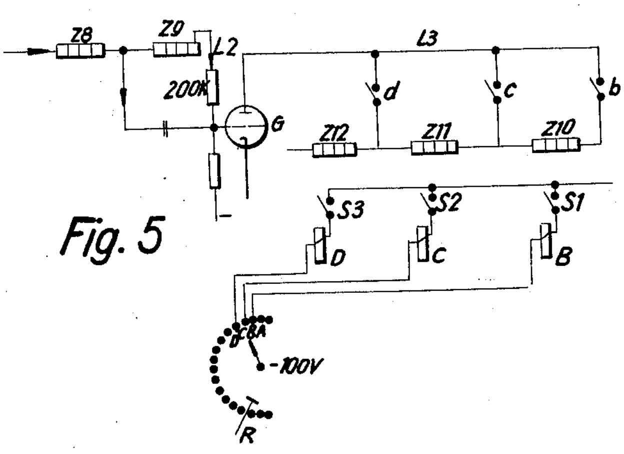

Fig. 5, another form of an arrangement.

From a known pulse source, not shown, pulses pass to an electronic control first decade counter Z8 (Fig. 1) which after every ten pulses applies a transfer pulse to a second counter Z9. The cycle of operation of the electronic calculating machine of the type to be described below comprises a counter Z9 receiving ten pulses during such a cycle. With the tenth pulse it gives off a transfer pulse which conditions the arrangement for the next cycle of operation. The last trigger circuit of counter Z9 also switches a gate G on or off after every five pulses.

Fig. 2 shows the system of connections of counter Z9 which in principle presents the connection of a decadic counter equipped with four trigger circuits. The operation of such counters is known from Patent 2,690,303 of Nolde et al. and therefore need not be described in detail. Generally, these counters operate with dual tetrads, but as it is necessary to operate within the scope of the invention with a valence of five pulses, the counter had to be altered accordingly to retain its simplicity, so that the trigger occupying first place in a strictly dually operating counter occupies here the last place and the switching arrangement shown in Fig. 2 results. The four triggers are marked 1 to 4 and the two tube sections for each trigger, A and B.

The mode of operation of the counter is as follows:

In initial position all triggers are at zero, that is to say, all tube sections A are conducting. The first pulse arriving in trigger 1 switches it to section B, so that value "1" is indicated. The second pulse switches trigger circuit 1 again to zero, that is, to section A, and a negative pulse is transmitted to the anode conductor of trigger circuit 2 which thus switches from section A to section B and indicates binary value "2." The third pulse switches trigger circuit 1 to section B. The fourth pulse switches trigger circuit 1 again to section A while a negative pulse goes to trigger circuit 2 and switches it also to section A, a negative pulse being sent again to trigger circuit 3 and switches it to section B. The fifth pulse switches trigger circuit 1 to section B. As the grid of tube section B of trigger circuit 1 is closed, it is always negatively biased when section B of trigger circuit 1 is conducting. Owing to the switching of trigger circuit 1 from section A to section B, this grid receives a negative pulse, so that trigger circuit 3 switches from section B to section A. Thereby a negative pulse is sent to trigger circuit 4 which thus switches from section A to section B, and, furthermore, from the anode conductor of section A of trigger 3 a negative pulse is applied to the grids of the tube sections B of triggers 1 and 2 with the result that in trigger 2 section A continues to carry current and trigger 1 switches from section B to section A. After the fifth pulse there is therefore only one tube section B—that of trigger 4—in current-carrying condition. The sixth pulse switches trigger 1 again from section A to section B. The seventh pulse switches trigger 1 to section A and trigger 2 to section B. The eighth pulse switches trigger 1 to section B. The ninth pulse switches trigger 1 to section A, trigger 2 to section A and trigger 3 to section B. The tenth pulse switches trigger 1 to section B, and a negative pulse is sent again to the grid of the tube section B of trigger 3 which is thereby switched to section A and applies a negative pulse to trigger 4 which is switched and to the grids of the tube section B of triggers 1 and 2, so that these triggers switch to zero position or remain therein.

One cycle of operation of counter Z9 is now completed and the latter again in zero position. Whilst counter Z9 is switched to zero a negative pulse is issued from anode A of trigger 4, which serves as stated for stepping up the machine.

In Fig. 3 the cycle of operation of counter Z9 from the fourth to the tenth pulse from counter Z8 is schematically shown. It will be seen that the tube section B of trigger 4 becomes conducting with the fifth pulse and remains in this condition up to the tenth pulse. Due to the switching of trigger 4 from A to B with the fifth pulse, an increase of voltage occurs at its anode A and a positive constant pulse is sent out by counter Z9. This pulse opens gate G shown in Fig. 1 until the last trigger circuit of counter Z9 is switched again by the tenth pulse and the voltage applied to anode A of trigger 4 drops.

As shown in Fig. 1, a conductor L0 connects the first counter Z8 with the second counter Z9, and a conductor L0, L1 leads from the first counter Z8 to the grid of gate G. Furthermore, a conductor L2 leads from the last trigger of second counter Z9 over a decoupling resistance R3 to the grid of gate G. A contact *h*3 is provided in the plate circuit L3 of gate G for providing a connection via conductors L4, L5, via contacts *f*2 or *f*3 and conductors L6, L7 or L8 respectively, depending on the position of contact *h*3, to the respective counters Z10, Z11 and Z12 which are to be rounded off. Resistances R1 and R2 of 100,000 and 10,000 ohms respectively are arranged in the grid circuit L9 of gate G. A potential of −150 volts is applied to grid circuit L9. There is furthermore provided a contact *f*1 which is connected via conductor L10, which provides a connection with a stepping switch relay R via conductors L11 or L12 and contacts *h*1 or *h*2. A potential of −100 volts is applied to the sliding contact of stepping switch relay R. Contacts *h*1, *h*2, *h*3 and *f*1, *f*2, *f*3 are actuated by relays H and F respectively which are excited by manual closing of switches S1, S2, and S3 via conductors L13, L14, L15, L16, switch S1 being co-ordinated with counter Z10, switch S2 with counter Z11, and switch S3 with counter Z12 so that a switch may be closed depending on the decimal which it is desired to round off. When switch S1 is closed, counter Z10 is sensed, rounded off, and a transfer pulse is transmitted to counter Z11. When switch S2 is closed, a digit is entered into counter Z11, and Z12 is rounded off. When switch S3 is closed, digits are entered into counter Z12 and the carry-over is entered into a counter arranged ahead of counter Z12 but not shown.

As mentioned above, the second counter Z9 transmits a pulse to gate G between positions "five" and "six." In order to prevent gate G from opening indiscriminately in any case, its grid bias is held so far on the negative side, for example at −150 volts, that the pulses transmitted from the first counter Z8 and second counter Z9 remain without effect.

The particular circuit of this gate G is shown in more detail in Fig. 4 and will now be described with reference to the drawing.

The double triode illustrated in the Fig. 4 is an element of the trigger circuit 4 of the second control counter Z9, the conductor L12 which leads to gate G has its origin at the plate of the trigger as shown. The remainder of the circuit diagram is as shown in Fig. 1.

For a clearer understanding of the operation of the device of the invention, a specific numerical example will now be presented.

The potential drop between the current-carrying and the no-current condition causes a change in the plate voltage of the double triode illustrated +50 v. to +150 v. When the grid of gate G is connected to a line carrying a potential of −150 v. and a positive potential is transmitted from the last trigger circuit of the second counter Z9 via the decoupling resistance R3 to the grid, the grid bias is raised to approximately −50 v. and the tube does not become conductive, i.e. the gate G remains closed.

When thereafter, as described in more detail below, a connection is established from the grid of gate G via L9, the resistance R1, L10, contacts *f*1, *h*1 to the sliding contact of the stepping switch relay R to which a potential of −100 v. is being applied as mentioned above, the grid voltage further increases, and the positive potential or pulse originating in the second counter Z9 opens gate G via conductor L2 by raising the grid bias to a value at which the pulses originating in the first counter Z8 and transmitted via L0, L1 become effective.

The sixth to tenth pulses transmitted from the first counter Z8 via L0, L1 cause gate G to become conductive briefly in response to each of these pulses, the plate voltage dropping off at every instance of conductivity, and a negative pulse as a sensing pulse being supplied to counters Z10, Z11, and Z12, respectively, via conductor L3, contacts *h*3, conductors L4 or L5, and contacts *f*3 or *f*2.

The process of rounding off will now be explained with specific reference to Fig. 1. If, for example, the second decimal place after the decimal point is to be rounded off, corresponding to counter Z11, it is necessary to close switch S1. Relay F is excited and contacts *f*1, *f*2, *f*3 are switched over. Contact *f*1 is moved from the upper to the lower position and is connected to *h*1 via conductor L11. Contact *f*2 is closed and thus connects counter Z10 with gate G via L6, *f*2, L4 and *h*3. Contact *f*3 is moved to the lower position. When the wiper contact of the stepping switch relay R, which automatically sweeps across the fixed contacts in a known manner during each calculating cycle, assumes the proper position, a potential of −100 v. is thus applied to the grid conductor L9 of gate G via conductor L10 and contacts *f*1 and *h*1.

As described above, counter Z10 is connected to gate G via conductor L6, the switched-over contact *f*2, conductor L4, contact *h*3 and conductor L3. A number of pulses corresponding to the aforementioned pulse cycle are now entered into the first counter Z8 which releases carry-over pulses in accordance with the decimal counting mode of said first counter Z8. These carry-over pulses are transmitted via conductor L0 into the second counter Z9 and reach gate G via conductors L0, L1 remaining ineffective in the gate until the fifth carry-over pulse is entered, gate G remaining closed until then. The fifth carry-over pulse entering said second counter Z9 from the first counter Z8 releases a permanent positive pulse which is added to the grid bias of −150 volts. This permanent pulse is transmitted to gate G via L2, R3 and opens the gate. The fifth to tenth carry-over pulse originating from the first counter Z8 is entered in the second counter Z9 via L0 until the second counter Z9 is switched over by the tenth carry-over pulse, and furthermore reach the counter Z10 via lines L0, L1, gate G, L3, and contacts *h*3, L4 contact *f*2 and conductor L6. If the value contained in said counter Z10 equals or exceeds five, counter Z10 because of the entry of the fifth to tenth pulse generates a carry-over pulse towards counter Z11, whereby said counter Z11 is advanced one unit value. If the value contained in said counter Z10 is smaller than five, no carry-over pulse is generated and the counter Z11 which is to be rounded off keeps its calculated value. After the cycle has been completed and switch S1 is opened, the contacts revert to their starting positions.

If counter Z12 is to be rounded off, counter Z11 must be sensed. This is done by actuating switch S2 and exciting relay H thereby. Contact *h*2 is closed, contact *h*1 is in the upper position and contact *h*3 is in the upper position. The sliding contact of stepping switch relay R which sweeps the contacts in a known manner during each calculating cycle becomes effective only when in the contact position with contact *h*2. The above-described process is repeated, but the pulses are entered in counter Z11 via contacts *h*3 and *f*3.

The schematic shown in Fig. 5 illustrates an additional embodiment of the device of the invention. This device also operates with a stepping switch relay R by means of which relays B, C, and D are excited alternatively if the coordinated switches S1, S2, and S3 respectively are closed. The contacts *b*, *c*, *d* which are actuated by relays B, C, D provide connections with the counters Z10, Z11, and Z12 respectively. Rounding-off is done in the same manner as in the first-described device.

We claim:

1. In an electric calculator having apparatus for rounding off a product counter; comprising the product counter; a first and a second resettable counter each including means for releasing carry-over pulses and resetting itself to zero when its counting capacity is reached;

a gate and a relay means; said first counter being connected to said second counter for transmitting carry-over pulses thereto for successively advancing said second counter; said second counter including means responsive to five carry-over pulses from said first counter for producing and transmitting a carry-over pulse to said gate; a stepping switch relay and switches actuated thereby and connected to said gate for making said gate electrically conductive in response to said last mentioned carry-over pulse; said gate being connected to said first counter to control the gating of carry-over pulses originating from said first counter; said relay means being arranged in said circuit for entering into said product counter the carry-over pulses originating in said first counter and passing said gate; said second counter being arranged to release a carry-over pulse for blocking said gate after entry of the tenth carry-over pulse from said first counter.

2. Apparatus according to claim 1, wherein the product counter includes a plurality of decade counters connected in cascade, and manually operable switching means for selectively establishing circuit connections for rounding off a desired product decade counter.

References Cited in the file of this patent

UNITED STATES PATENTS

| | | |
|---|---|---|
| 2,274,053 | Ferry | Feb. 24, 1942 |
| 2,366,890 | Wheeler | Jan. 9, 1945 |
| 2,394,602 | Fishack | Feb. 12, 1946 |
| 2,538,636 | Williams | Jan. 16, 1951 |
| 2,701,095 | Stibitz | Feb. 1, 1955 |
| 2,800,278 | Thomas | July 23, 1957 |